United States Patent
Dezonno et al.

(10) Patent No.: US 7,912,205 B2
(45) Date of Patent: Mar. 22, 2011

(54) CONTACT CENTER BUSINESS MODELER

(75) Inventors: Tony Dezonno, Bloomingdale, IL (US); Roger Sumner, Batavia, IL (US); Sandy Biggam, Bloomingdale, IL (US); Mike Hollatz, Huntley, IL (US); Dave Wesen, Channahon, IL (US)

(73) Assignee: Aspect Software, Inc., Lombard, IL (US)

( * ) Notice: Subject to any disclaimer, the term of this patent is extended or adjusted under 35 U.S.C. 154(b) by 1464 days.

(21) Appl. No.: 11/015,410

(22) Filed: Dec. 17, 2004

(65) Prior Publication Data

US 2006/0147025 A1 Jul. 6, 2006

(51) Int. Cl.
H04M 3/54 (2006.01)

(52) U.S. Cl. .......... 379/265.02; 379/265.03; 705/11

(58) Field of Classification Search .. 379/265.01–266.1, 379/265.02, 265.03; 705/8, 10, 11
See application file for complete search history.

(56) References Cited

U.S. PATENT DOCUMENTS

| | | | |
|---|---|---|---|
| 5,410,586 A * | 4/1995 | Davies | 379/14 |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,163,607 A * | 12/2000 | Bogart et al. | 379/266.01 |
| 6,167,395 A | 12/2000 | Beck et al. | |
| 6,170,011 B1 | 1/2001 | Macleod Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,697,858 B1 | 2/2004 | Ezerzer et al. | 709/224 |
| 6,732,156 B2 | 5/2004 | Miloslavsky | |
| 7,376,227 B2 * | 5/2008 | Anisimov et al. | 379/265.03 |
| 7,783,513 B2 * | 8/2010 | Lee | 705/11 |
| 2001/0011228 A1 | 8/2001 | Shenkman | 705/14 |
| 2001/0032120 A1 | 10/2001 | Stuart et al. | 705/11 |
| 2002/0038217 A1 | 3/2002 | Young | 705/1 |
| 2002/0067821 A1 * | 6/2002 | Benson et al. | 379/265.02 |
| 2002/0143599 A1 * | 10/2002 | Nourbakhsh et al. | 705/9 |
| 2002/0165757 A1 | 11/2002 | Lisser | 705/10 |
| 2002/0184069 A1 * | 12/2002 | Kosiba et al. | 705/8 |
| 2003/0081757 A1 | 5/2003 | Mengshoel et al. | 379/265.06 |
| 2003/0095652 A1 | 5/2003 | Mengshoel et al. | 379/265.06 |
| 2003/0177082 A1 | 9/2003 | Buckwalter | 705/36 |
| 2003/0187675 A1 | 10/2003 | Hack et al. | 705/1 |
| 2003/0225591 A1 * | 12/2003 | Clay et al. | 705/1 |

(Continued)

Primary Examiner — Gerald Gauthier
(74) Attorney, Agent, or Firm — Husch Blackwell LLP (57) ABSTRACT

A method and apparatus are provided for automatic call distributors that route calls based in part on timely business information. The method includes providing a simulation model for calculating information and using this information from the model together with key process indicators information to generate decisions for routing calls.

45 Claims, 7 Drawing Sheets

U.S. PATENT DOCUMENTS

| | | | |
|---|---|---|---|
| 2004/0034543 A1 | 2/2004 | Bartsch | 705/1 |
| 2004/0073441 A1* | 4/2004 | Heyns et al. | 705/1 |
| 2004/0073442 A1 | 4/2004 | Heyns et al. | 705/1 |
| 2004/0083116 A1 | 4/2004 | Joyce | 705/1 |
| 2005/0013428 A1* | 1/2005 | Walters | 379/266.08 |
| 2005/0041796 A1* | 2/2005 | Joseph et al. | 379/266.03 |
| 2006/0098583 A1* | 5/2006 | Baker et al. | 370/252 |
| 2006/0147025 A1* | 7/2006 | Dezonno et al. | 379/265.02 |

* cited by examiner

| SOLUTION | Cost Per Seat ($) | Implement Time (days) | Risk Factor (0-100) | Gap Impact (%) | ROI (%) | Optimal Decision |
|---|---|---|---|---|---|---|
| Applicant Testing | 100 | 30 | 40 | 20 | 374 | 6.49 |
| Skill Based Routing | 400 | 50 | 50 | 75 | 315 | 4.51 |
| Applicant Screening | 250 | 40 | 30 | 30 | 184 | 2.18 |
| CT Integration | 900 | 120 | 75 | 90 | 137 | 1.91 |
| Value Based Routing | 400 | 60 | 60 | 55 | 128 | 1.49 |
| Monitoring/Coaching | 300 | 60 | 40 | 65 | 118 | 1.33 |
| Product Training | 600 | 90 | 65 | 35 | 91 | 1.01 |
| Expert Systems | 1500 | 180 | 95 | 55 | 89 | .94 |
| Contract Tracking | 3000 | 120 | 85 | 50 | 64 | .85 |
| Performance Comp | 300 | 30 | 10 | 15 | 64 | .65 |
| CB Training | 600 | 90 | 35 | 35 | 53 | .61 |

Fig. 8

CONTACT CENTER BUSINESS MODELER

FIELD OF THE INVENTION

The field of the invention relates to telephonic communication systems and more particularly to automatic call distributors that route calls based in part on timely business information.

BACKGROUND OF THE INVENTION

Automatic call distribution systems are known, such systems are typically used in an organizational context as a means of distributing telephone calls among agents of the organization. To improve the consistency and quality of call handling, agents are typically segregated into groups to serve particular call targets of the organization.

Often the organization disseminates a single telephone number to its customers and to the public in general as a means of contacting the organization. As calls are directed to the organization from the telephone network, the automatic call distribution system directs the calls to its agents based upon some algorithm, typically based upon availability. For example, where all agents are considered equal, the automatic call distributor may distribute the calls based upon which agent position or telephone has been idle the longest.

Previous solutions that route transactions or calls based on contact center performance statistics such as service level, agent occupancy, and average speed of answer are limited in that they can not be programmed effectively to simulate or route transactions based on timely business key process indicators (KPI) information. Another disadvantage is that existing solutions, although referencing a profit business indicator, do not disclose the usage of a simulation model to determine impacts on KPIs, assignment of routings across multiple business objectives, nor address the overall business cost process in assigning routes to calls. Furthermore, the relationship to business operational objectives, such as a goal to increase sales by a certain percentage, are not directly driven as part of the contact center routing operation such that the results from the contact center could not be automatically calculated together or in combination with information from the business systems.

Determining KPI metrics for a business objective are well known, but their incorporation as a factor in the routing of calls is a previously unexplored field. The article, A Standard for Business Architecture description, IBM SYSTEMS JOURNAL, VOL 38, NO 1, 1999, discusses in general terms the relationships between various business concepts to show how these can be used in an information technology environment but does not teach implementing or incorporating the concepts into equipment for routing transactions. The article, An analytic approach for quantifying the value of e-business initiatives, IBM SYSTEMS JOURNAL, VOL 42, NO 3, 2003, shows the following as meaningful business operational metrics but fails to disclose how these can or should be coupled with contact center call statistics to create call routing decisions: "shareholder value added", "operating income", "return on net assets", "cash to cash cycle time", "operating profit margin", "inventory turnover", "days receivables outstanding", "days payables", "on time delivery", "order to delivery lead time".

The present invention addresses these and other deficiencies inherent in existing automatic call distribution systems. In one embodiment, there is provided a call distribution system and method that incorporates a simulation model to determine impacts on KPI, assignment of routings across multiple business objectives and addresses the overall business cost process in assigning routes to calls. Another embodiment provides a system for a closed loop simulation of contact center business KPIs objectives and operational objectives by allowing stand alone modeling and scenario analysis to be used indirectly in production and allowing use of true production feedback to improve the model. In another form, a model is provided to simulate or route transactions (calls) based on timely business (KPI) information.

Other variations include, simulation models to account for the relationship to business operational objectives, such as a goal to increase sales by a specific percentage, directly driven as part of the contact center routing operation such that the results/path from the contact center can be automatically calculated together or in combination with information from the business systems. In one form, it is desirable that a programmable model be used that has two modes. One mode that allows entry of a model and one that allows only for altering simulation values to prevent changes to the structure of the model. As the model that can be created may be unique for each business structure, a variety of model configurations are possible.

SUMMARY

A system and method are provided for distribution of calls using a simulation model to process information used for routing the calls. In one embodiment, the invention comprises inputting information to the simulation model from select business sources, calculating and generating information from the model, and determining key process indicators information. Then decisions are generated for routing a call based on the information from the model and key process indicators information, and a call is routed based on the generated decisions.

DETAILED DESCRIPTION OF A PREFERRED EMBODIMENT

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

Figure 1:
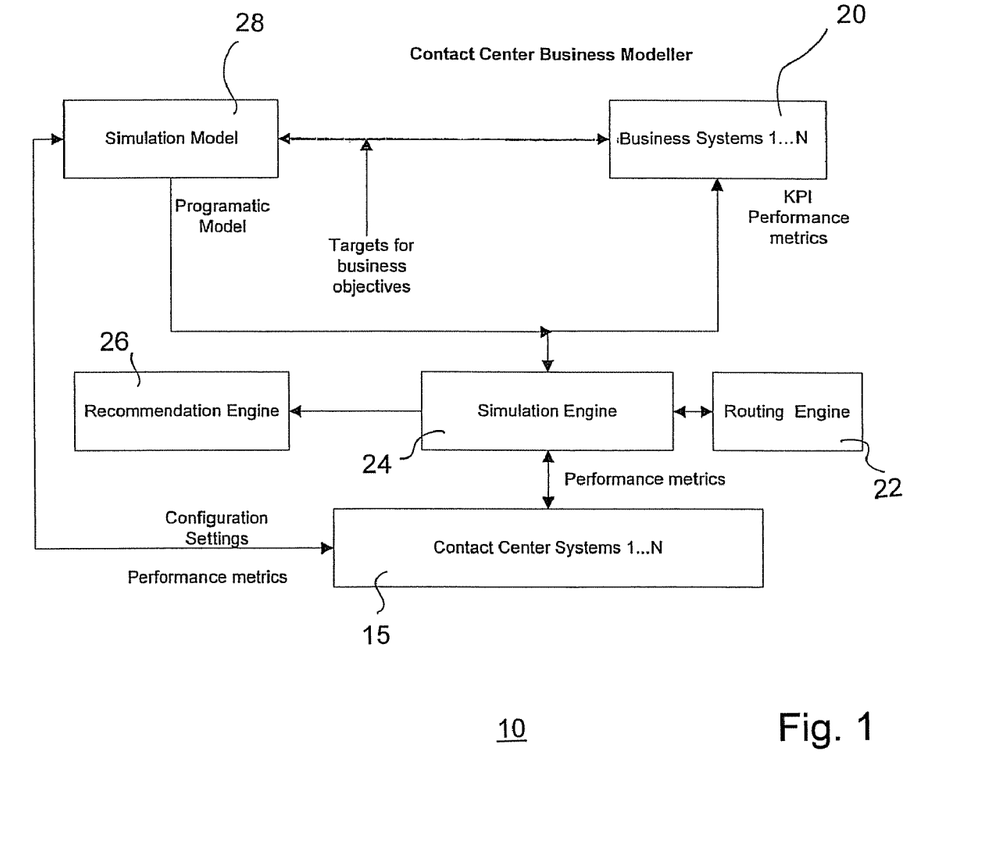
FIG. 1 is a block diagram of one embodiment of a contact center business modeler of the present invention.

One embodiment of the invention is shown in FIG. 1 to highlight major functional elements and how they might be constructed together, although other representations are possible. As shown in FIG. 1, the architecture of a contact center business modeler 10 in one embodiment comprises the following components: contact center systems 15, business systems 20, routing engine 22, simulation engine 24 (also referred to in this specification as simulator 24), simulation model 28, and an optional recommendation engine 26. FIG. 1 depicts the contact center business modeler 10 in a context of use with one or more contact center systems. The simulation model 28 may receive data information from business system(s) 20 and contact center system(s) 15 and provide output to a simulation engine 24. Routing engine 22 assists with directing the processing of transactions and recommendation engine 26, in one embodiment, may compare simulated output against a predetermined business objective and show reasons why the objective cannot be satisfied and what corrective action can be taken to satisfy the objective. Alternate configurations contain both the simulation model 28 and the simulation engine 24 as a single component.

Figure 2:
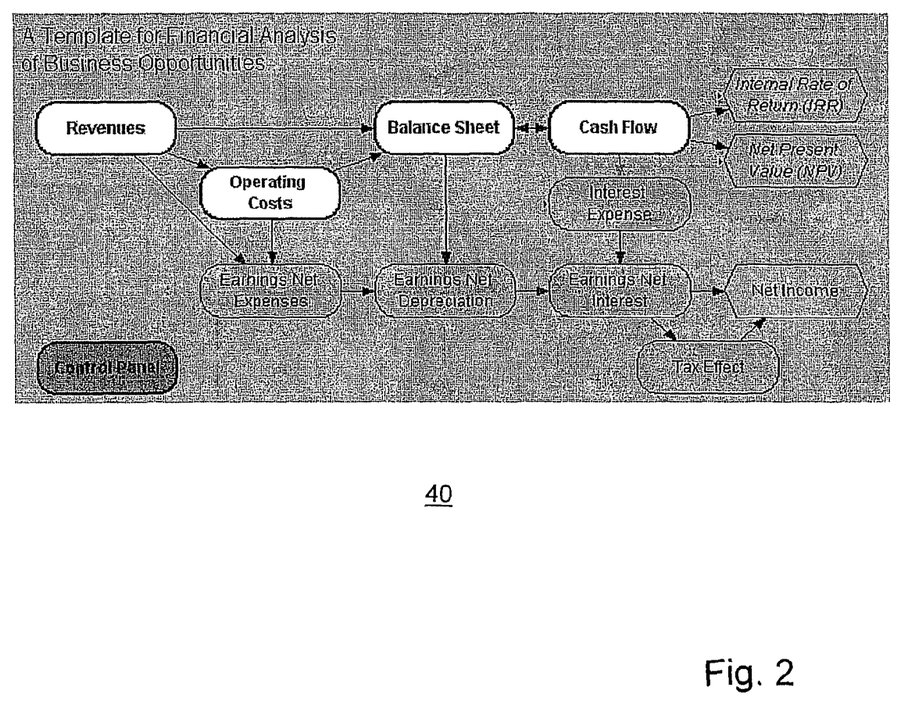
FIG. 2 is a block diagram of an example of a model for a business that may be programmed into a simulator for calculating key process indicators values.

FIG. 2 shows one embodiment of a business model 40 that is programmed into a simulator for calculating key process indicators (KPI) values. It is important for each of the parameters in the model to be programmable in the model to reflect different types of business models, i.e., product or service, and models across different businesses such as, for example, any type of business market such as retail, web, help desk, financial centers, utilities, long distance carriers. The data for programming the model can be transmitted through a variety of data communication automation technologies, such as ODBC, OLAP, OLE, XML and derivatives, ASCII, USB, RS-232, LAN, PROJECT® and EXCEL® files from Microsoft, web services, and the likes to the modeler for processing.

Once the simulator 24 calculations are completed and accepted, the output from the simulator may be sent directly to the routing engine for directing the processing of transactions. It is also desirable that the simulator 24 collects information from the router so that simulator parameters can be adjusted to match the current router conditions for optimal transaction routing against the business objectives. Further, information such as sales, forecast, orders, cost, expense, and income data may be collected from a business system as a key process indicator (KPI) input for altering the behavior of the modeler simulation model to give differing outputs to the simulator 24 as business results change. Each of the oval shape represents a simulation process objective in the business model in FIG. 2.

Figure 3:
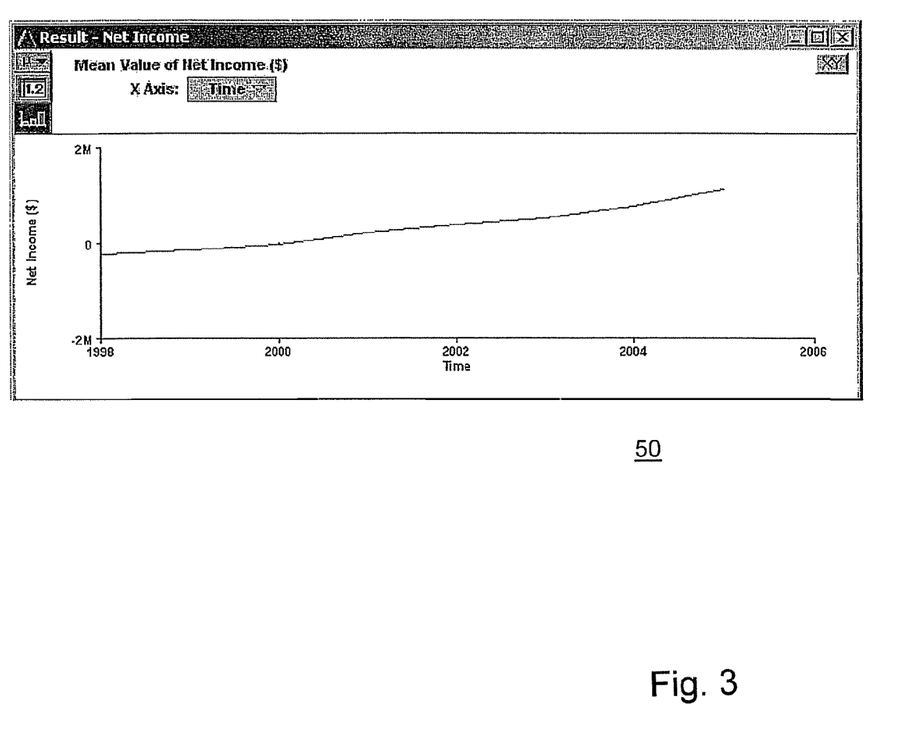
FIG. 3 is a screen view of an example of a modeler used to simulate a key process indicators result.

As an example of a screen view of a modeler 50 KPI result shown in FIG. 3 is the ANALYTICA product available from a company named LUMINA DECISION SYSTEMS. Alternately, MATHLAB V available from MATHLAB, Inc. could be used in the role of the simulator and offers additional advantages such as native code software creation of the model. In this example a business model is created to reflect and perform a financial analysis of business opportunities. As shown in FIG. 3, after running the modeler, the simulation of a KPI result occurs. This simulation shows an approximate $1 M Net Income results in the year 2004 based on the configuration of costs and expense KPI information as part of the business model.

Figure 4:
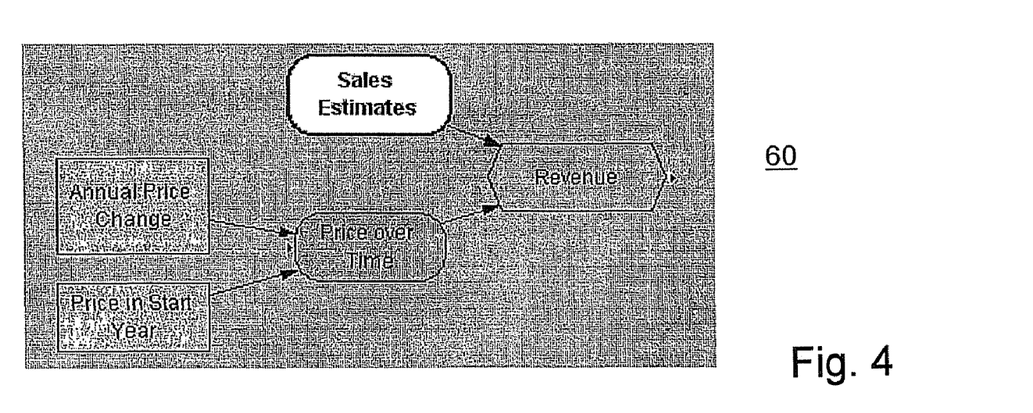
FIG. 4 is a block diagram of an example of a model for a revenue block calculation.
Figure 5:
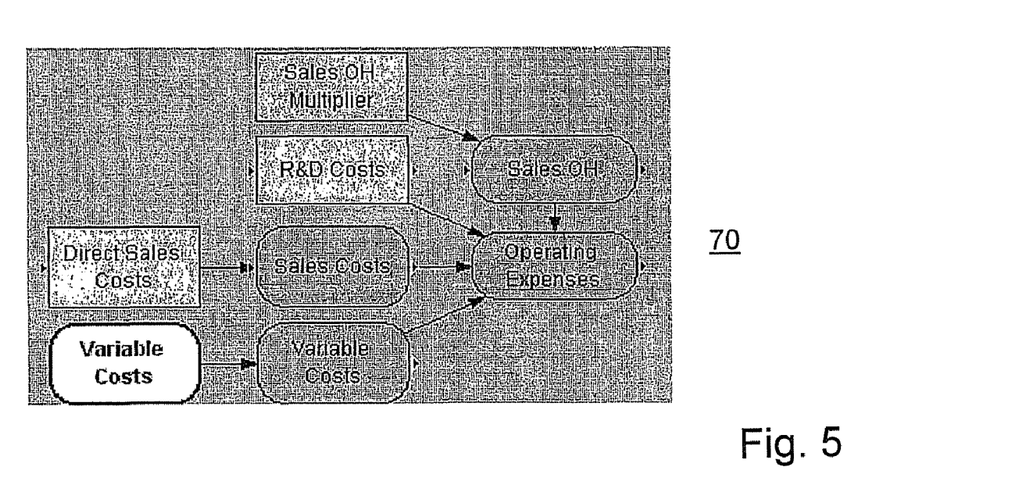
FIG. 5 is a block diagram of an example of a model for a variable cost sheet block expansion.
Figure 6:
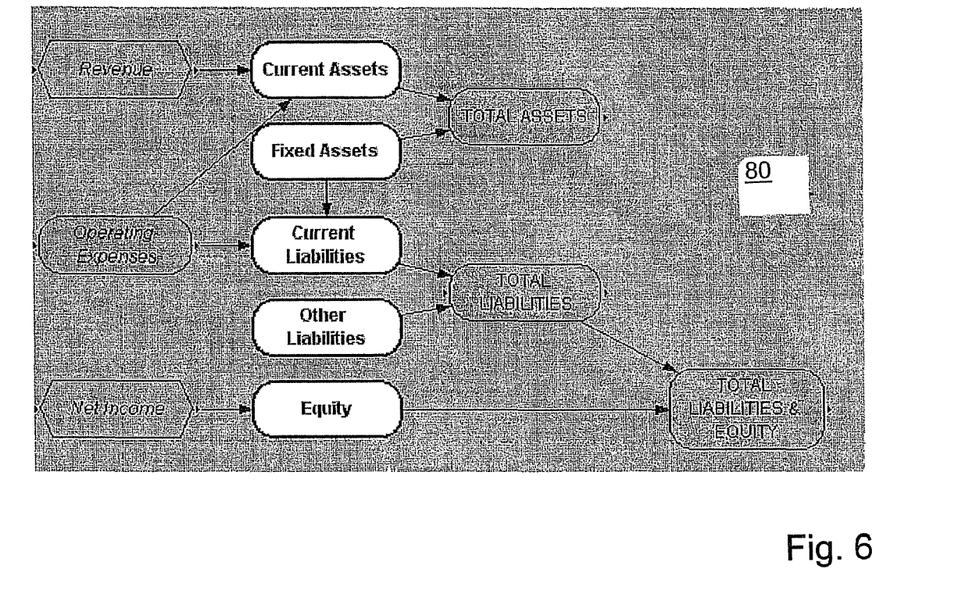
FIG. 6 is a block diagram of an example of a model for a balance sheet block expansion.
Figure 7:
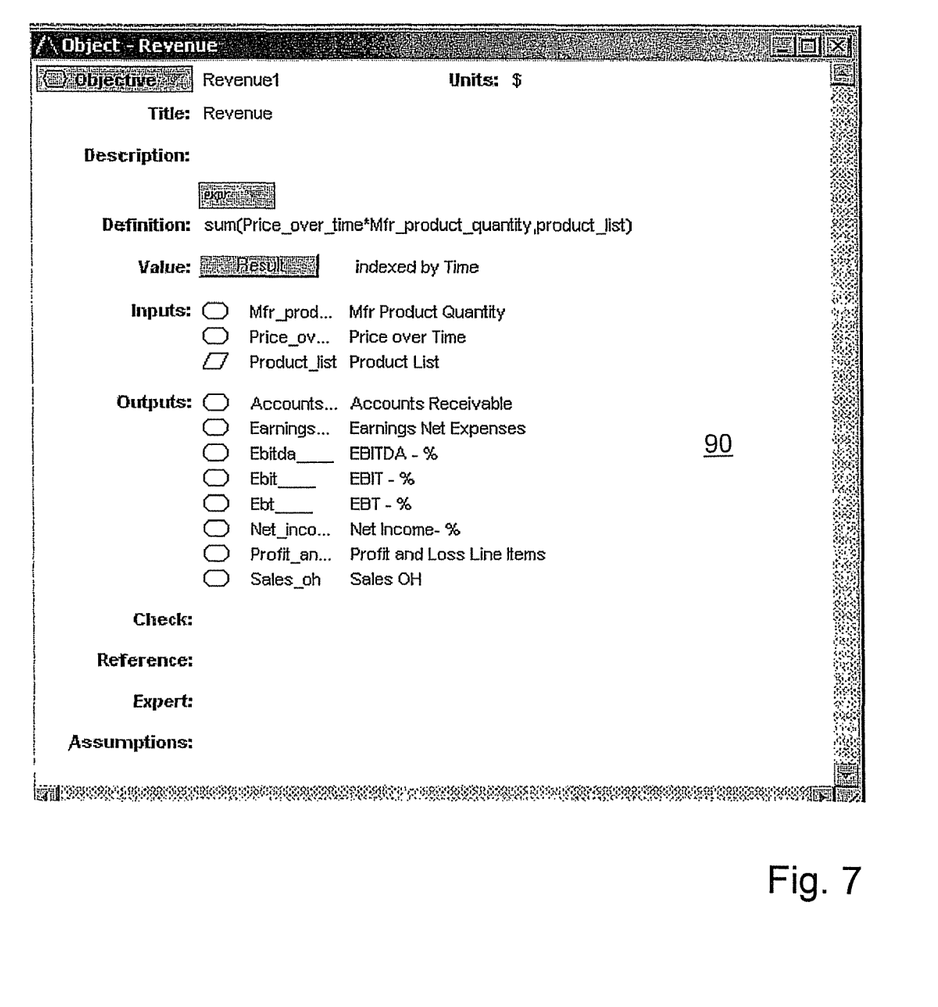
FIG. 7 is a screen view of an example of a modeler used to program the revenue block with select collected parameters.

FIG. 4 shows a block diagram of an example of a model for a revenue block calculation 60 which illustrates how the revenue block may be calculated from the interconnected blocks. FIG. 5 shows a block diagram of an example of a model for a variable cost sheet block expansion 70. FIG. 7 shows a screen view of an example of a modeler 90 used to program a revenue block with select collected parameters. The revenue block may be programmed with the collected parameters as shown in FIG. 7. These parameters may be collected, for example, from the router or a real time KPI source to provide information to the modeler to make simulation (indirectly) and ultimately production based routing decisions. The definition field assigns a calculation function to the block value output. In this example, the modeler may collect current revenue amount information from a business system as input into the revenue block for processing in a new simulation. The output of net income can be provided back to the business system, to a system operator for analysis, or to the router for making routing decisions. An example of an additional modeling block 80 is shown in FIG. 6 of one embodiment of a balance sheet block expansion.

After a simulation completion, the information generated by the simulator may be sent to the Business Systems 20, a recommendation engine, and a router engine to alter the routing of transactions either singularly or in an associated group. It is often desirable that a programmable model be used that has 2 modes—one that allows entry of a model and one that allows only for altering simulation values to prevent changes to the structure of the model. As the model that can be created may be unique for each business structure, a variety of model configurations are possible. Some of the contact center specific solutions that may be presented to the model to represent the contact center include, but are not limited to, the equations shown below (developed at Purdue University):

| Metrics | Formulas |
| --- | --- |
| INBOUND EFFICIENCY METRICS | |
| Talk time (min) | = (GAP in minutes) × (inbound calls handled)/(60 minutes per hour) × (hourly rate for a TSR in $) |
| After call work time (min) | = (GAP in minutes) × (inbound calls handled)/(60 minutes per hour) × (hourly rate for a TSR in $) |
| Calls abandoned (%) | = (GAP in %) × (inbound calls offered) × (perfect score in %) × (percent of perfect score resulting in loyalty in %) × (1 + positive word of mouth factor) × (customer lifetime value in $) × (1 − % abandoned that call back immediately) |
| Time in queue (sec) | = (GAP in seconds) × (inbound calls offered)/(60 minutes per hour) × (costs of toll-free call in cents per minute) |
| Calls blocked (%) | = (GAP in %) × (inbound calls offered) × (percent of perfect score resulting in loyalty in %) × (1 + positive word of mouth |

-continued

| Metrics | Formulas |
|---|---|
| | factor) × (customer lifetime value in $) × (1 − % abandoned that call back immediately) |
| TSR occupancy (%) | = (GAP in %) × (number of FTE hours per year) × (hourly rate for a TSR in $) |
| Time before abandoning (sec) | = (GAP in seconds)/(Industry average time before abandoning) × (calls abandoned in %) × (inbound calls offered) × (perfect score in %) × (percent of perfect score resulting in loyalty) × (1 + positive word of mouth factor) × (customer lifetime value) × (1 − % abandoned that call back immediately) |
| Adherence to schedule (%) | = (Gap in %) × (TSR occupancy in %) × (number of FTE hours per year) × (hourly rate for a TSR in $) |
| Calls per 8-hr shift per TSR | = (GAP) × (5 days a week) × (52 weeks per year) × (talk time in minutes) + (after call work time in minutes)/(60 minutes per hour) × (hourly rate for a TSR in $) |
| Data entry error per thousand inputs | = (GAP)/(10 to convert to percent) × (inbound calls handled) × (percent of calls that require data entry in %) × (time it takes to correct one data entry error in minutes)/(60 minutes per hour) × (hourly rate for a TSR in $) |
| HUMAN RESOURCE EFFICIENCY METRICS | |
| Turnover of part-time TSRs (%) | = (GAP in %) × (number of part-time TSRs) × (Cost to bring on a new TSR in $) |
| Turnover of full-time TSRs (%) | = (GAP) × (number of full-time TSRs) × (Cost to bring on a new TSR in $) |
| Initial training period (hours) | = (GAP in hours) × ((number of part-time TSRs) × (turnover in part-time TSRs in %) + (number of full-time TSRs) × (turnover in full-time TSRs in %)) × (hourly rate for a TSR in $) |
| Attendance (%) | = (GAP in %) × (number of FTE hours per year) × (hourly rate for a TSR in $) + (GAP in %) × (calls abandoned) × (inbound calls offered) × (perfect score in %) × (percent of perfect score resulting in loyalty in %) × (1 + positive word of mouth factor) × (customer lifetime value in $) × (1 − percent abandoned that call back in %) |
| Costs to recruit a new TSR ($) | = (GAP in $) × ((number of part-time TSRs × (turnover of part-time TSRs in %) + (number of full-time TSRs) × (turnover in full-time TSRs in %)) |
| Hourly rate for a TSR ($) | = (GAP in $) × (number of FTE hours per year) |
| INBOUND EFFECTIVENESS METRICS | |
| Up and cross sell opportunities (%) | = (GAP in %) × (IF(up & cross sell opportunities that result in sale in % = 0 THEN take industry average ELSE take up & cross sell opportunities that result in sale in %) × (inbound calls handled) × (average sales value per call in $) |
| Up and cross sell resulting in a sale (%) | = (GAP in %) × (IF(up & cross sell opportunities in % = 0 THEN take industry average ELSE take up & cross sell opportunities in %) × (inbound calls handled) × (average sales value per call in $) |
| Perfect caller satisfaction score (%) | = (GAP in %) × (inbound calls handled) × (percent of perfect score resulting in loyalty in %) × (1 + positive word of mouth factor) × (customer lifetime value in $) |
| Once and done, or first time final calls (%) | = (GAP in %) × (inbound calls handled) × (talk time in minutes) + (after call work time in minutes)/(60 minutes in an hour) × (hourly rate of a TSR in $) + (GAP in %) × (inbound calls handled) × (percent of perfect score resulting in loyalty in %) × (1 + positive word of mouth factor) × (customer lifetime value in $) |

The metrics above represent possible KPI values for the contact center and some of them involve collecting transaction information across multiple business systems such as the final metric on the list—"Once and Done". One benefit of this approach is that not only does it allow for such conglomerated statistics to be created, but it also allows for the metric to be used as part of the determination of the routing of additional transactions. Each device in a contact center, such as an automatic call distributor (ACD), may provide its own set of KPI values that can be used in the modeling. Various devices (e.g., an Email processing system) may also be combined in the contact center to provide KPI metrics that can be combined with other contact center KPI statistics to provide an overall simulation of the effectiveness of the contact center. It is often desirable that these and other metrics be available directly to the simulator to create a model for doing contact routing decisions. Values may also be monitored, collected, or calculated from analyzing a data depository to be used within the simulation model from other equipment. Additionally, statistics available from reporting systems such as agents call handling time, application service levels or average speed of answer may be used for the calculations.

In certain embodiments, it is desirable that models for other contact center equipment, such as a voice response system be fabricated and used within the model to allow for systems that do not directly offer KPI statistics in order to calculate an optimum route decision. Also, models within the simulator for this equipment may also then present a more realistic view of the operation of the overall system of components.

Collecting information from the router is similar to collecting information from other contact center systems. Information such as the number of agents available or signed in are examples of statistical information that can be used within the model to direct the routing of transactions. Routing of call transactions may be accomplished generally as described in: U.S. Pat. No. 5,335,269 to Steinlicht; U.S. Pat. No. 5,365,581 to Baker et al.; and U.S. Pat. No. 5,384,841 to Adams et al., all incorporated herein by reference.

Upon completing the simulation, the simulator may also provide a recommended output based on the results seen in the simulation. The simulator may, for example, be programmed with a threshold that determines when a recommendation should be made, for instance, when a cost has exceeded 10% of a target business objective value. It may also display a probabilistic measure of the likelihood of meeting a business objective and further may use the probability measure as a means for making routing decisions in the model. For instance, if the likelihood that the caller has a DTMF phone based on the geographic location of the call origination is greater than 90%, the call could be routed to a device, such as an IVR, that can process the DTMF signals. The application of various technology solutions and their effect on the contact center can also be calculated and made available to a user. It is also desirable that the contact center be able to evaluate its performance automatically against metrics representing other contact centers within a specific industry. Creating a gap analysis involves comparing a contact center performance metric against the metric for a suitable peer group.

Figure 8:
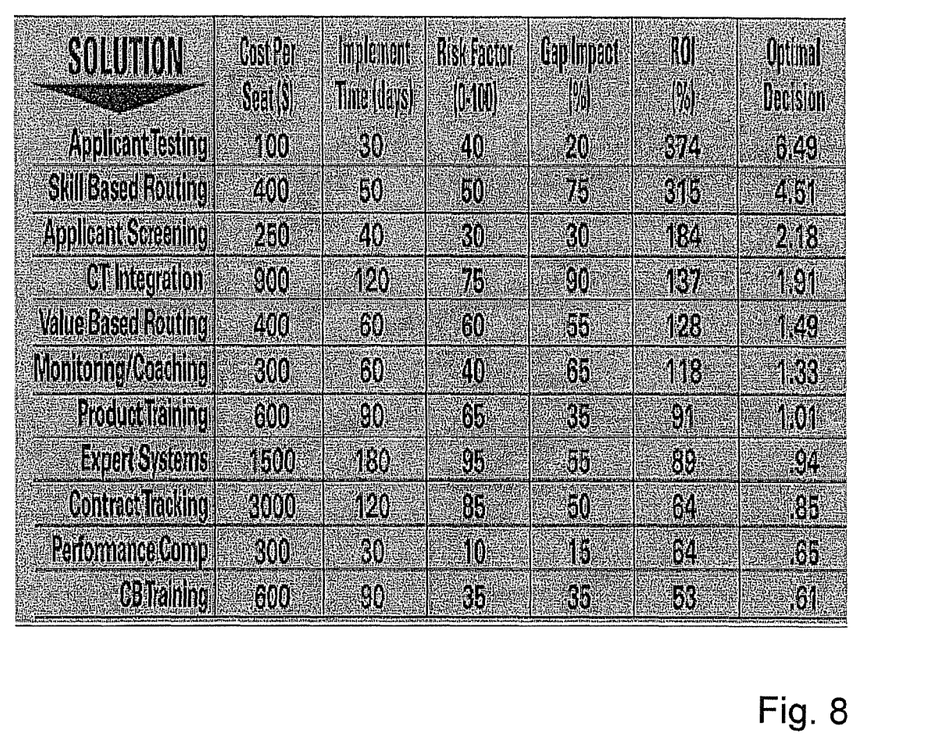
FIG. 8 is one example of a table illustrating metrics representing contact centers.

The recommendation engine may further compare the simulated output against the required objective showing reasons why the objective cannot be met and what, if any, corrective action can be taken to meet the objective. Reasons may include various combinations of cost, equipment, staffing, or time based justifications. Alternative recommendations may include resource or configuration considerations including adding additional agents or moving agents between particular applications to achieve the required performance objective dependant on the equipment which is included as part of the model. The engine may also display calculations, such as, for example, Return on Investment (ROI) that can be programmed into the model. The results of these calculations may also be shown with a probabilistic measure of achieving the goal within a given range. FIG. 8 shows one possible example of a table illustrating metrics representing contact centers values from which the recommendation engine may evaluate when performing a ROI evaluation. In this example a model with a target ROI value that is not met may use the values shown under the Solutions column in FIG. 8 to calculate strategy to recommend achieving the target ROI value within the specified constraints. The recommendation engine may also have a means of creating KPI adherence reports showing, over time and resources, the calculation of KPI values. The model can also be expanded to represent a conglomeration of business entities and to simulate the accumulative effect throughout an entire business enterprise.

Specific embodiments of novel methods and apparatus for construction of novel contact center business modelers have been described for the purpose of illustrating the manner in which the invention is made and used. It should be understood that the implementation of other variations and modifications of various possible embodiments of the invention and its various aspects will be apparent to one skilled in the art, and that the alternative possible embodiments of the invention is not limited by the specific embodiments described. Therefore, it is contemplated to cover any and all modifications, variations, or equivalents that fall within the true spirit and scope of the basic underlying principles disclosed and claimed herein.

What is claimed is:

1. A method for distribution of calls using a simulation engine to process information used for routing calls in a routing engine, said method comprising the steps of:
    inputting information including business objectives, current business information and real-time key process information to the simulation engine from select business sources;
    the simulation engine, using the input information, simulating key process indicators information which is sent directly to the routing engine for production based routing decisions, and collecting information from the routing engine for adjusting simulation engine parameters to match current router conditions for optimal transaction routing;
    routing the calls automatically by the routing engine based on the information from the simulation engine including the simulated key process indicators information sent directly from the simulation engine.

2. The method of claim 1 further comprising sending simulated output from the simulation engine and key process indicators information to a recommendation engine which compares the simulated output against business objectives and determines why a business objective cannot be satisfied and corrective action to satisfy the business objective.

3. The method of claim 1 further comprising using statistics from a contact center reporting system in the simulation engine for contact routing decisions for directing the processing of calls.

4. The method of claim 1 further comprising programming a business model into the simulator for calculating key process indicators values.

5. The method of claim 4 further comprising enabling each of the business model parameters to be programmable to reflect different types of business models.

6. The method of claim 1 further comprising providing for data for programming the model received through data communication automation technology.

7. The method of claim 1 further comprising collecting current revenue information from a business system for processing a new simulation in the simulation engine and providing the result to the routing engine for making routing decisions.

8. The method of claim 1 further comprising collecting information from a business system and inputting the information as key process indicator input for altering the behavior of the simulation model to provide differing outputs to the model as business results change.

9. The method of claim 1 further comprising programming a business model into the simulator for calculating the overall business cost process in assigning routes to calls.

10. The method of claim 1 further comprising inputting into the model information generated from one or more contact centers and using this information to assist in the routing of calls.

11. The method of claim 1 further comprising connecting an interactive voice response unit to the routed calls.

12. The method of claim 1 further comprising determining an average call handling time per call and inputting this information into the model.

13. The method of claim 1 further comprising determining a return on investment and displaying the return on investment.

14. The method of claim 1 further comprising a probability measure as a means for making routing decisions in the simulation engine.

15. The method of claim 1 further comprising collecting business information parameters from a router to provide information to the simulation model to make simulation and production based routing decisions.

16. The method of claim 15 further comprising providing for the simulation model output to be communicated to a business system for generating routing decisions.

17. The method of claim 15 further comprising sending the information generated by the simulation model to a key process indicator information system.

18. The method of claim 15 wherein the simulation model has two modes wherein one mode allows entry of a model and the other mode allows only for altering simulation values to prevent changes to the structure of the model.

19. The method of claim 1 further comprising combining an e-mail processing system in a contact center to provide key process indicator metrics used in combination with other contact center key process indicator information to provide an overall simulation of the effectiveness of the contact center.

20. A call distribution system that incorporates a simulation engine to process information used for routing calls in a routing engine, said system comprising:
   means for inputting information including business objectives and real time key process information to the simulation engine from select business sources;
   means for calculating and generating simulated information including simulated key process indicators from-in the simulation engine which simulated information is sent directly to the routing engine for production based routing decisions, and for collecting information from the routing engine to provide for simulation engine parameters to be adjusted to match the current router conditions for optimal transaction routing;
   means for generating decisions for routing the calls based on the information from the engine including key process indicators information; and
   means for routing a call based on the generated decisions.

21. The system of claim 20 further comprising means for sending simulated output from the simulation engine and key process indicators information to a recommendation engine which compares the simulated output against business objectives and determines why a business objective cannot be satisfied.

22. The system of claim 20 further comprising means for sending the simulated information generated from simulation engine to a recommended engine for determining corrective action to satisfy a business objective that cannot be satisfied.

23. The system of claim 20 further comprising means for programming a business model into the simulator for calculating key process indicators values.

24. The system of claim 23 further comprising means for enabling each of the business model parameters to be programmable to reflect different types of business models.

25. The system of claim 20 further comprising providing means for programming the model with data received through data communication automation technology.

26. The system of claim 20 further comprising means for allowing the simulation engine to collect current revenue information from a business system for processing a new simulation in the simulation engine and providing the result to the routing engine for making routing decisions.

27. The system of claim 20 further comprising means for collecting information from a business system and inputting the information as a key process indicator input for altering the behavior of the simulation model to provide differing outputs to the model as business results change.

28. A method of dynamically routing calls in a routing engine based on processed business information, the method comprising the steps of:
   determining simulated key process indicators information in a simulation engine using business objectives, real time key process indicators, and current business information and sending the simulated key process indicator information directly to the routing engine, and the simulation engine collecting information from the routing engine to provide for simulation parameters to be adjusted to match the current router conditions for optimal transaction routing;
   generating decisions for routing, by the routing engine, a plurality of calls based on the simulated key process indicators information send directly from the simulation engine; and
   routing a plurality of calls automatically by the routing engine based upon the generated decisions.

29. The method of dynamically routing calls based on processed business information of claim 28 further comprising combining the key process indicators information with contact center call statistics to generate call routing decisions.

30. A method of dynamically routing calls based on processed business information of claim 28 further comprising calculating in combination information generated from a contact center with information generated from various business systems and using this information to generate call routing decisions.

31. The method of dynamically routing calls based on processed business information of claim 28 further comprising providing a simulation model to determine impacts on key process indicators information.

32. The method of dynamically routing calls based on processed business information of claim 28 further comprising providing a simulation model to assist with assigning routings of calls across multiple business objectives.

33. The method of dynamically routing calls of claim 28 further comprising correlating call associated information obtained from business systems with the content of a database of key process indicators information.

34. The method of dynamically routing calls based on processed business information of claim 28 further comprising providing for a contact center to evaluate its performance automatically by comparing metrics from other contact centers.

35. The method of dynamically routing calls based on processed business information of claim 28 further comprising providing for a recommendation engine to compare the simulated output from the simulation engine against required business objectives and showing reasons why a specific required business objective cannot be satisfied.

36. The method of dynamically routing calls based on processed business information of claim 35 further providing for the recommendation engine to suggest corrective action that can be taken to accomplish the specific required business objective.

37. An apparatus for dynamically routing calls in a routing engine based on processed business information, the apparatus comprising:
   means for determining simulated key process indicators information in a simulation engine using business objectives and real-time key process indicators and sending the simulated information directly to the routing engine, and the simulation engine collecting information from the routing engine for adjusting simulation parameters to match current router conditions;

means for generating decisions for routing in a routing engine a plurality of calls based on the simulated key process indicators information; and means for routing a plurality of calls automatically in the routing engine based upon the generated decisions.

38. The apparatus for dynamically routing calls based on processed business information of claim 37 further comprising means for combining the key process indicators information with contact center call statistics to generate call routing decisions.

39. The apparatus for dynamically routing calls based on processed business information of claim 37 further comprising means for calculating in combination information generated from a contact center with information generated from various business systems and using this information to generate call routing decisions.

40. A system for dynamically routing calls based on processed business information, the system comprising:

a simulation engine including a simulation model;

a simulation engine interface operatively coupled with a contact center system to communicate performance metrics of the contact center system to the simulation engine; and a simulation engine interface operatively coupled with a business system to communicate performance metrics of the business system to the simulation engine and the simulation engine coupled to a routing engine to automatically route calls based on simulation results of the simulation engine coupled directly from the simulation engine to the routing engine for production based routing decisions, and the simulation engine collecting information from the routing engine to provide for simulation engine parameters to be adjusted to match current router conditions for optimal transaction routing.

41. The system for dynamically routing calls based on processed business information of claim 40 further comprising:

a routing engine for directing the processing of contact center transaction.

42. The system for dynamically routing calls based on processed business information of claim 40 further comprising a recommendation engine which compares the simulation results against business objectives to determine why a business objective cannot be satisfied and to determine corrective action to satisfy the business objective.

43. The system for dynamically routing calls based on processed business information of claim 40 further comprising an interactive voice response unit for the routed calls.

44. The system for dynamically routing calls of claim 40 further comprising an e-mail processing system.

45. The system for dynamically routing calls of claim 40 further comprising the simulation engine programmed with a threshold that determines when a recommendation should be made.

* * * * *